April 2, 1968   J. L. FISHER   3,376,026
CARBURETOR FUEL BOWL FLOAT
Filed March 30, 1966

INVENTOR.
James L. Fisher
BY
C. K. Veenstra
ATTORNEY

United States Patent Office 3,376,026
Patented Apr. 2, 1968

3,376,026
CARBURETOR FUEL BOWL FLOAT
James L. Fisher, Brockport, N.Y., assignor to General Motors Corporation, Detroit, Mich., a corporation of Delaware
Filed Mar. 30, 1966, Ser. No. 538,799
1 Claim. (Cl. 261—70)

ABSTRACT OF THE DISCLOSURE

A float for an internal combustion engine carburetor fuel bowl is constructed with a recess on the forward side to improve its response to a change in the attitude or angular orientation of the fuel level within the carburetor relative to the attitude of the carburetor.

---

Figure 1:
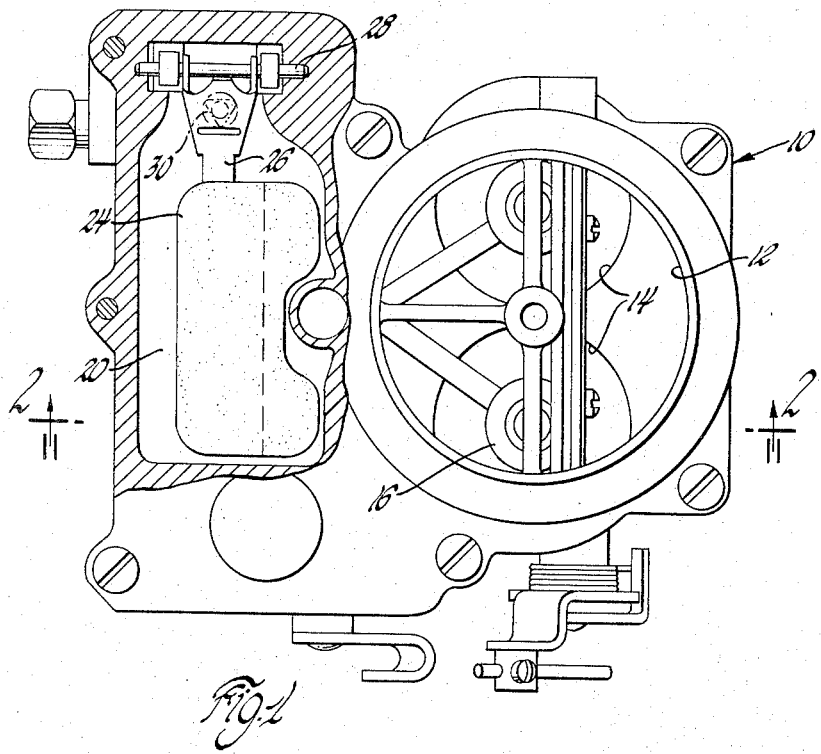

During vehicle manuevers such as climbing or descending hills and acceleration or deceleration, the attitude of the fuel surface or level within the carburetor fuel bowl relative to the carburetor does not remain constant but instead respectively drops or rises at the front of the fuel bowl and correspondingly rises or drops at the back of the fuel bowl. When the fuel bowl is located in front of the mixture conduits, the fuel level correspondingly rises or drops in the fuel passage extending from the back of the fuel bowl to the mixture conduits. For the most desirable engine operation, it is necessary that the fuel level in the passage stay below the spill point in the passage and at the same time stay above the opening into the fuel passage from the fuel bowl.

With some previous float constructions and mounting arrangements, however, the float loses buoyancy as the fuel level rises in the fuel passage, thereby admitting more fuel into the bowl and thus raising the fuel level in the passage even further toward the spill point; rich operation of the engine results. These same floats correspondingly gain buoyancy as the fuel level drops in the passage, thereby reducing fuel flow into the bowl and causing lean operation of the engine.

This invention provides a float construction which will more accurately control fuel flow into the fuel bowl during such vehicle maneuvers. The front of this float, that is, the side opposite the spill point in the fuel passage, is formed with a recess so that the center of buoyancy of the float is moved more closely to the fuel passage. The float is thus more sensitive to the fuel level within the passage and controls the admission of fuel into the bowl accordingly.

Figure 2:
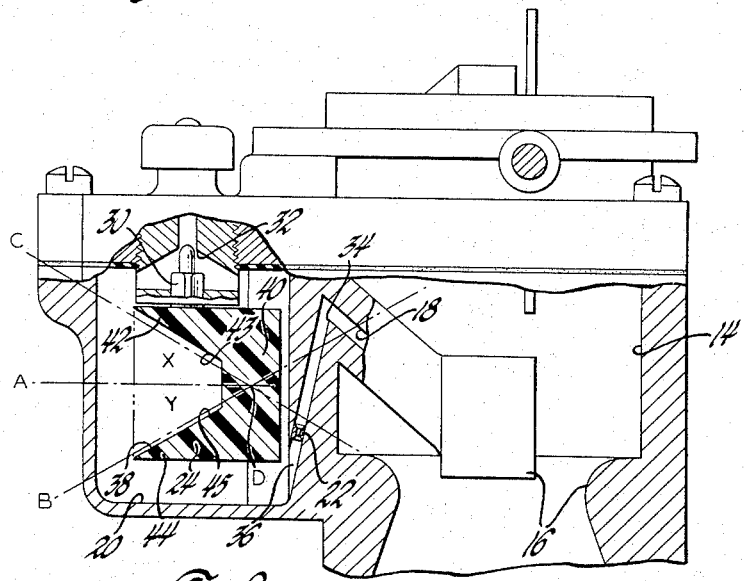

The details as well as other objects and advantages of this invention are disclosed in the following description and in the drawing in which:

FIGURE 1 is a top plan view of a carburetor with portions broken away to show the disposition of the float within the fuel bowl; and FIGURE 2 is a partial sectional view along line 2—2 of FIGURE 1 showing the construction of the float.

Referring to the drawing, a carburetor 10 has an air inlet 12 through which air flows to a pair of mixture conduits 14. A venturi arrangement 16 is disposed within each mixture conduit 14 to create a reduced pressure signal indicative of the rate of air flow through the carburetor to the engine. This pressure signal draws fuel through a passage 18 from a fuel bowl 20. Fuel flow through passage 18 is metered by an orifice 22 and discharges into venturi arrangement 16.

A float 24, disposed within fuel bowl 20, is supported by an arm 26 pivotally mounted on a pin 28. As the fuel level indicated in FIGURE 2 by line A drops, float 24 follows. Float 24 positions an inlet valve 30 which cooperates with an inlet port 32 to control the admission of fuel to bowl 20. The operation of float 24 and valve 30 is designed to maintain the fuel in bowl 20 at the level indicated by line A.

Fuel passage 18 rises to a spill point 34 above the fuel level A to prevent draining of the fuel directly into the mixture conduit. However, upon a vehicle maneuver such as climbing of a very steep hill, the attitude of the fuel level relative to the carburetor may change past that indicated by line B. In such a case, the spill point 34 may be submerged beneath the fuel level B, resulting in flooding of the engine. Conversely, upon a vehicle maneuver such as descending that hill the attitude of the fuel level relative to the carburetor may change past that indicated by line C. In such an instance the opening 36 into the fuel passage 18 from bowl 20 may be exposed above the fuel level C resulting in lean operation of the engine.

As shown in FIGURE 2, the various attitudes of the fuel level indicated by lines A, B, and C intersect in an area, indicated herein by a point D. It will be appreciated that if float 24 is disposed between point D and spill point 34, the float will be responsive to a rise in the fuel level in passage 18 and will close inlet valve 30 to prevent spill point 34 from being submerged. Conversely, float 24 will open inlet valve 30 when the fuel level in passage 18 drops to admit additional fuel and prevent exposing opening 36.

This invention provides a float so constructed. In the illustrated embodiment, the center of buoyancy of float 24 is located between D and spill point 34. As shown in FIGURE 2, a recess 38 is formed by a main vertical portion 40; an upper, overhanging portion 42 having an inclined surface 43; and a lower, underhanging portion 44 having an inclined surface 45.

With such a construction, as the attitude of the fuel level changes from that indicated by line A to that indicated by the line C, the float does not gain the buoyancy, indicated by the trapezoidal area X between lines A and C, which it would otherwise gain had it a rectangular cross-section. Thus the float drops and opens inlet valve 30 to increase the fuel level in passage 18. Similarly, as the attitude of the fuel level changes from that indicated by line A to that indicated by line B the float does not lose the buoyancy indicated by the trapezoidal area Y between lines A and B and thus holds inlet valve 30 closed to prevent additional fuel from entering the bowl and spilling past the point 34. With this construction, the float is sensitive to changes in fuel level in passage 18 and controls the inlet valve more closely in accordance with the requirements of the engine.

It will be appreciated that other changes in construction and configuration of the float and the carburetor may be made in accordance with this invention.

I claim:

1. An internal combustion engine carburetor comprising a mixture conduit, a fuel supply system adapted to contain fuel at a predetermined level, said fuel supply system including a fuel bowl having an inlet port for admitting fuel thereto and a fuel passage having an opening from said fuel bowl and extending to a discharge point in said mixture conduit, said opening being submerged below said fuel level, said fuel passage having a spill point above said fuel level, the relative attitudes of said fuel level and carburetor varying within a predetermined range which is limited by the relative attitude at which said opening of said passage is exposed above said fuel level and by the relative attitude at which said spill point in said passage is submerged below said fuel level, said fuel bowl having a predetermined area of intersection through which said fuel level extends at all relative attitudes within said range, said carburetor also comprising an inlet valve for controlling fuel flow through said inlet port and a fuel level responsive float disposed in said fuel bowl and connected to said inlet valve for positioning said inlet valve within said inlet port to control fuel flow into said fuel bowl in response to changes in said fuel level, said float including a main vertical portion from which an upper overhanging portion and a lower underhanging portion protrude, said upper and lower portions protruding from the side of said float opposite said fuel passage spill point, said upper portion having a lower downwardly inclined surface extending from its outer extremity to said main portion and said lower portion having an upper upwardly inclined surface extending from its outer extremity to said main portion, said upper and lower portions forming a recess on the side of said float opposite said fuel passage spill point whereby at least a major portion of said float is interposed between said area of intersection and said spill point, said float thereby being sensitive to changes in the fuel level in said fuel passage.

References Cited

UNITED STATES PATENTS

| | | | |
|---|---|---|---|
| 1,295,306 | 2/1919 | Hale et al. | |
| 2,485,437 | 10/1949 | Dwyer | 137—433 X |
| 2,628,826 | 2/1953 | Worden | 261—72 X |
| 3,153,422 | 10/1964 | Marsee et al. | 73—322.5 X |

RONALD R. WEAVER, *Primary Examiner.*